United States Patent
Kim et al.

(10) Patent No.: US 9,609,403 B2
(45) Date of Patent: Mar. 28, 2017

(54) METHOD OF CONTROLLING OPTICAL NETWORK UNIT (ONU) IN SLEEP MODE

(71) Applicant: Electronics and Telecommunications Research Institute, Daejeon (KR)

(72) Inventors: Geun Yong Kim, Gwangju (KR); Dong Soo Lee, Gwangju (KR); Sung Chang Kim, Gwangju (KR); Hark Yoo, Gwangju (KR); Young Suk Lee, Gwangju (KR); Hee Do Kim, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/484,433

(22) Filed: Sep. 12, 2014

(65) Prior Publication Data
US 2015/0104174 A1    Apr. 16, 2015

(30) Foreign Application Priority Data

Oct. 11, 2013 (KR) .......... 10-2013-0121518

(51) Int. Cl.
*H04J 14/02* (2006.01)
*H04J 3/16* (2006.01)
*H04B 10/564* (2013.01)
*H04Q 11/00* (2006.01)

(52) U.S. Cl.
CPC . *H04Q 11/0067* (2013.01); *H04Q 2011/0064* (2013.01); *H04Q 2011/0079* (2013.01)

(58) Field of Classification Search
CPC ....... H04Q 11/0067; H04Q 2011/0079; H04Q 2011/0086; H04B 10/272
USPC ................................ 398/67, 66, 43
See application file for complete search history.

(56) References Cited

U.S. PATENT DOCUMENTS

| | | | |
|---|---|---|---|
| 2010/0046941 A1* | 2/2010 | Stadler ................ | H04B 10/27 398/25 |
| 2011/0211837 A1 | 9/2011 | Sugawa et al. | |
| 2012/0045210 A1* | 2/2012 | Kim .................... | H04L 41/0893 398/66 |
| 2012/0106976 A1* | 5/2012 | Bernard .............. | H04J 3/0647 398/154 |
| 2012/0166819 A1* | 6/2012 | Skubic ............... | G06F 1/3278 713/300 |
| 2014/0133843 A1* | 5/2014 | Kim .................... | H04B 10/272 398/9 |

(Continued)

OTHER PUBLICATIONS

Lei Shi et al., "Energy-Efficient PON with Sleep-Mode ONU: Progress, Challenges, and Solutions" IEEE Network, vol. 26, Issue 2, pp. 36-41, Mar. 2012.

*Primary Examiner* — Oommen Jacob
(74) *Attorney, Agent, or Firm* — Rabin & Berdo, P.C.

(57) ABSTRACT

Provided is a method of saving power in a passive optical network (PON) system including an optical line terminal (OLT) and a plurality of optical network units (ONUs), the OLT including an optical transceiver to communicate with at least one ONU through an optical line, and a controller to control the optical transceiver to transmit an upstream bandwidth map to the ONU at a predetermined transmission interval, wherein the transmission interval is determined based on a desired upstream data service delay time.

13 Claims, 8 Drawing Sheets

(56) References Cited

U.S. PATENT DOCUMENTS

| | | | |
|---|---|---|---|
| 2014/0185504 A1* | 7/2014 | Miura | H04L 12/12 370/311 |
| 2014/0233950 A1* | 8/2014 | Luo | H04Q 11/0067 398/66 |
| 2014/0321854 A1* | 10/2014 | Ghazisaidi | H04J 3/1694 398/58 |
| 2015/0104174 A1* | 4/2015 | Kim | H04Q 11/0067 398/67 |
| 2015/0171965 A1* | 6/2015 | Ohteru | H04B 10/27 398/58 |

* cited by examiner

METHOD OF CONTROLLING OPTICAL NETWORK UNIT (ONU) IN SLEEP MODE

CROSS-REFERENCE TO RELATED APPLICATION

This application claims the benefit of Korean Patent Application No. 10-2013-0121518, filed on Oct. 11, 2013, in the Korean Intellectual Property Office, the disclosure of which is incorporated herein by reference.

BACKGROUND

1. Field of the Invention

The present invention relates to a passive optical network (PON) system including an optical line terminal (OLT) and a plurality of optical network units (ONUs).

2. Description of the Related Art

An optical network is a technology that effectively provides a necessary band to a subscriber terminal. The optical network may have a point-to-point structure or a point-to-multipoint structure. An optical line terminal (OLT) may include an interface to support a plurality of optical network units (ONUs), and have control over the ONUs. In general, the point-to-point structure is used for an active optical network (AON), and the point-to-multipoint structure is used for a passive optical network (PON). Standardization on such structures is being conducted by international standardization organizations, such as the Institute of Electrical and Electronics Engineers (IEEE) and International Telecommunication Union-Telecommunication Standardization Sector (ITU-T).

Due to recognition of a necessity for power saving in a next generation optical network, the ITU-T achieved standardization with respect to two low power modes, a doze mode and a cyclic sleep mode, in G987.3 standards. The standardization relates to signaling between an ONU and an OLT, and state machine management. An optical transmitter and an optical receiver may be subject to power reduction. In the doze mode, an optical receiver of the ONU may be activated continually, and an optical transmitter of the ONU may be activated/deactivated (on/off) periodically. In the cyclic sleep mode, both the optical transmitter and the optical receiver may be activated/deactivated (on/off) periodically.

The OLT may register an ONU in an operation state through a registration process standardized in an ONU management control interface (OMCI) of G987.3 and G988. When conditions for transition to a sleep mode are satisfied, the ONU may operate in the sleep mode. The ONU may operate in a sleep mode set using an OMCI channel during the registration process, between the doze mode and the cyclic sleep mode. Events related to a transition to the sleep mode and a signaling method are described in G987.3.

Conventional standards describe a signaling message between an OLT and an ONU in a case of transitioning to a sleep mode and a normal mode to secure an intercompatibility between vendors, a definition of events, and a state machine. Based on signaling of a PON interval, an amount of power applied to an optical module of the ONU may be reduced.

In this example, there is a desire for a method of minimizing a delay time of upstream data and maximizing an effect of reducing an amount of power used by the ONU, by reducing an amount of time used for the transitioning of the ONU from the doze mode to the normal mode. Accordingly, a necessity for conducting research on various power saving schemes of reducing such power consumption is continuing to increase.

SUMMARY

An aspect of the present invention provides a technology that reduces an amount of power used by an optical network unit (ONU) operating in a doze mode, in a 10-gigabit-capable passive optical network 1 optical line terminal (XG-PON1 OLT) and ONU system standardized by G987.

Another aspect of the present invention also provides a technology that minimizes a delay time of upstream data by reducing a time used for transitioning an ONU from a doze mode to a normal mode.

According to an aspect of the present invention, there is provided an OLT including an optical transceiver to communicate with at least one ONU through an optical line, and a controller to control the optical transceiver to transmit an upstream bandwidth map to the ONU at a predetermined transmission interval.

The transmission interval may be determined based on a desired upstream data service delay time. The transmission interval may be determined based on the desired upstream data service delay time, and a delay time determined based on a characteristic of the ONU. The delay time determined based on the characteristic of the ONU may be determined based on at least one of an operating time of a function block to detect a local wake-up indication (LWI) event occurring in the ONU, an operating time used to control an optical transceiver of the ONU, a delay time used to process data in a memory of the ONU, and a time used to process a physical layer operation, administration, and maintenance (PLOAM) message in the ONU. The transmission interval may be calculated by the following equation, $$SI = 2T_d - D_{process}.$$

In the equation, SI denotes the transmission interval, $T_d$ denotes the desired upstream data service delay time, and $D_{process}$ denotes a delay time determined based on a characteristic of the ONU. Accordingly, the transmission interval may be set to be less than or equal to twice the desired upstream data service delay time.

In another example, the OLT may transmit the upstream bandwidth map to the ONU. The upstream bandwidth map may include bandwidth information for reception of a PLOAM message and an ONU management control interface (OMCI). The upstream bandwidth map may further include bandwidth information for data transmission.

According to another aspect of the present invention, there is also provided an ONU including an optical transceiver to receive an upstream bandwidth map from an OLT at a predetermined transmission interval, and a controller to control a transition of the optical transceiver to a doze mode for a predetermined period. The transmission interval may be determined based on a desired upstream data service delay time. The ONU may not transmit idle data for a time during which the ONU operates in a listen state, and transmit idle data to the OLT for a time during which the ONU operates in a doze aware state.

According to still another aspect of the present invention, there is also provided a method of saving power in an ONU connected to an OLT through an optical line, the method including operating the ONU in a doze mode, receiving an upstream bandwidth map transmitted from the OLT at a predetermined transmission interval, and performing a state transition to a normal mode when an LWI event is applied to the ONU or the OLT. The transmission interval may be determined based on a desired upstream data service delay time.

The transmission interval may be determined based on the desired upstream data service delay time, and a delay time determined based on a characteristic of the ONU. The delay time determined based on the characteristic of the ONU may be determined based on at least one of an operating time of a function block to detect an LWI event occurring in the ONU, an operating time used to control an optical transceiver of the ONU, a delay time used to process data in a memory of the ONU, and a time used to process a PLOAM message in the ONU.

The transmission interval may be calculated by the following equation, $$SI = 2T_d - D_{process}.$$

In the equation, SI denotes the transmission interval, $T_d$ denotes the desired upstream data service delay time, and $D_{process}$ denotes a delay time determined based on a characteristic of the ONU.

The transmission interval may be set to be less than or equal to twice the desired upstream data service delay time.

The upstream bandwidth map may include bandwidth information for reception of a PLOAM message and an OMCI. The upstream bandwidth map may further include bandwidth information for data transmission.

The method may further include not transmitting idle data for a time during which the ONU operates in a listen state, and transmitting idle data to the OLT for a time during which the ONU operates in a doze aware state, by the ONU.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
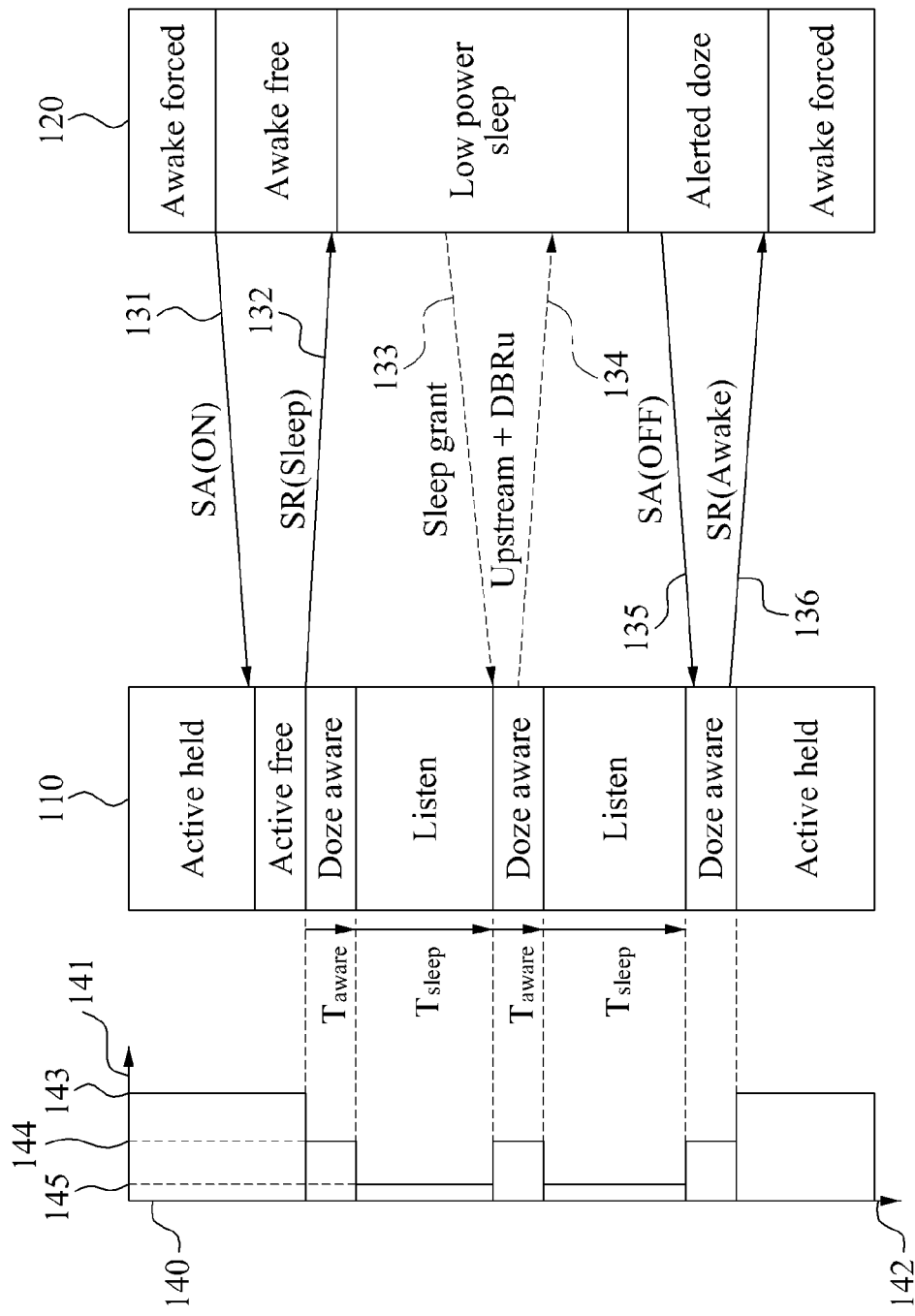
FIG. 1 is a diagram illustrating an optical network unit (ONU) operating in a doze mode in a passive optical network (PON) system according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a power saving method according to an embodiment of the present invention may be performed by an optimal network unit (ONU) and an optical line terminal (OLT) in a passive optical network (PON) system.

FIG. 1 is a diagram illustrating an ONU operating in a doze mode in a PON system according to a related art.

In implementation of a sleep mode in which an OLT is standardized to reduce a power consumption of an ONU in 10-gigabit-capable passive optical networks (XG-PONs) corresponding to G987 standards, an effect of reducing the power consumption of the ONU may increase and a data transmission delay time may be reduced. In the PON system, each of the OLT and the ONU may include a sleep mode state machine. The OLT may manage sleep mode state machines of all registered ONUs.

Referring to FIG. 1, a state 110 of the ONU, a state 120 of the OLT, and a graph 140 of the power consumption of the ONU are illustrated. The ONU operating in the doze mode may repeatedly switch between a doze aware state and a listen state. Values predetermined through an ONU management control interface (OMCI) may be used for a time during which the ONU operates in the doze aware state and a time during which the ONU operates in the listen state, respectively. Referring to the graph 140, it may be understood that the power consumption may be reduced based on the state 110 of the ONU. In the graph 140, an x axis 141 denotes a power, and a y axis 142 denotes a time. When the state 110 of the ONU corresponds to an active state, the power consumption may be maximized at a value 143. When the state 110 of the ONU corresponds to a doze aware state, the power consumption may be reduced to a value 144. When the state 110 of the ONU corresponds to a listen state, the power consumption may be minimized at a value 145. Repeated switching between the doze aware state and the listen state may be referred to as a doze mode. In FIG. 1, $T_{aware}$ denotes a time during which the ONU remains in the doze aware state, and $T_{sleep}$ denotes a time during which the ONU remains in the listen state.

The ONU operating in the doze mode may activate a transmitter of an optical transceiver in the doze aware state and deactivate the transmitter in the listen state, thereby reducing the power consumption. In the doze mode, a receiver of the optical transceiver of the ONU may maintain an activation state continually. Thus, a transmission delay time of data to be transmitted downstream may be reduced, and a quality of service may be maintained.

When it is sensed that the OLT or the ONU violates conditions for a sleep mode while the ONU is operating in the doze mode, the ONU may switch from the doze mode to a normal mode. A case in which the ONU violates the conditions for the sleep mode may include a case in which traffic being applied to a user network interface (UNI) port of the ONU is sensed. In an example, the case in which the ONU violates the conditions for the sleep mode may include one of a case in which a subscriber of the ONU turns on a personal computer (PC), a case in which the subscriber picks up a receiver of a voice over Internet Protocol (VoIP) phone, and a case in which the subscriber turns on an Internet Protocol television (IPTV). When the conditions for the sleep mode are violated, the ONU may immediately perform a transition to the normal mode, and transmit, to the OLT, a physical layer operation, administration, and maintenance (PLOAM) message to inform that the transition to the normal mode is performed. The OLT receiving the PLOAM message from the ONU may change the state of the ONU to the normal mode.

When the OLT senses, earlier than the ONU, that a specific ONU does not satisfy the conditions for the sleep mode, the OLT may transmit, to the ONU, forced wake-up indication (FWI) information or a PLOAM message to instruct the ONU to perform a transition to the normal mode. In an example, the case in which it is sensed that the ONU violates the conditions for the sleep mode may include a case in which an external phone call is received at a VoIP phone. In this example, when the FWI information or the PLOAM message is received from the OLT, the ONU may immediately perform the state transition to the normal mode. When the OLT operating in an alerted doze state transmits an OFF PLOAM message 135 to the ONU, the ONU may transmit an awake PLOAM message 136 to the OLT.

Referring to FIG. 1, a process in which the ONU operates in the doze mode in the PON system according to G987.3 standards is disclosed. When the OLT operating in an awake forced state transmits an ON PLOAM message 131 to the ONU, the ONU may enter the doze mode while transmitting a sleep PLOAM message 132 to the OLT in response to the ON PLOAM message 131. The ONU may repeatedly switch between the doze aware state and the listen state, thereby reducing the power consumption when compared to an active state. The OLT may transmit an upstream bandwidth map 133 to the ONU operating in the doze mode at a predetermined interval. The ONU may transmit a dynamic bandwidth reporting for upstream (DBRu) signal 134 to the OLT.

Figure 2:
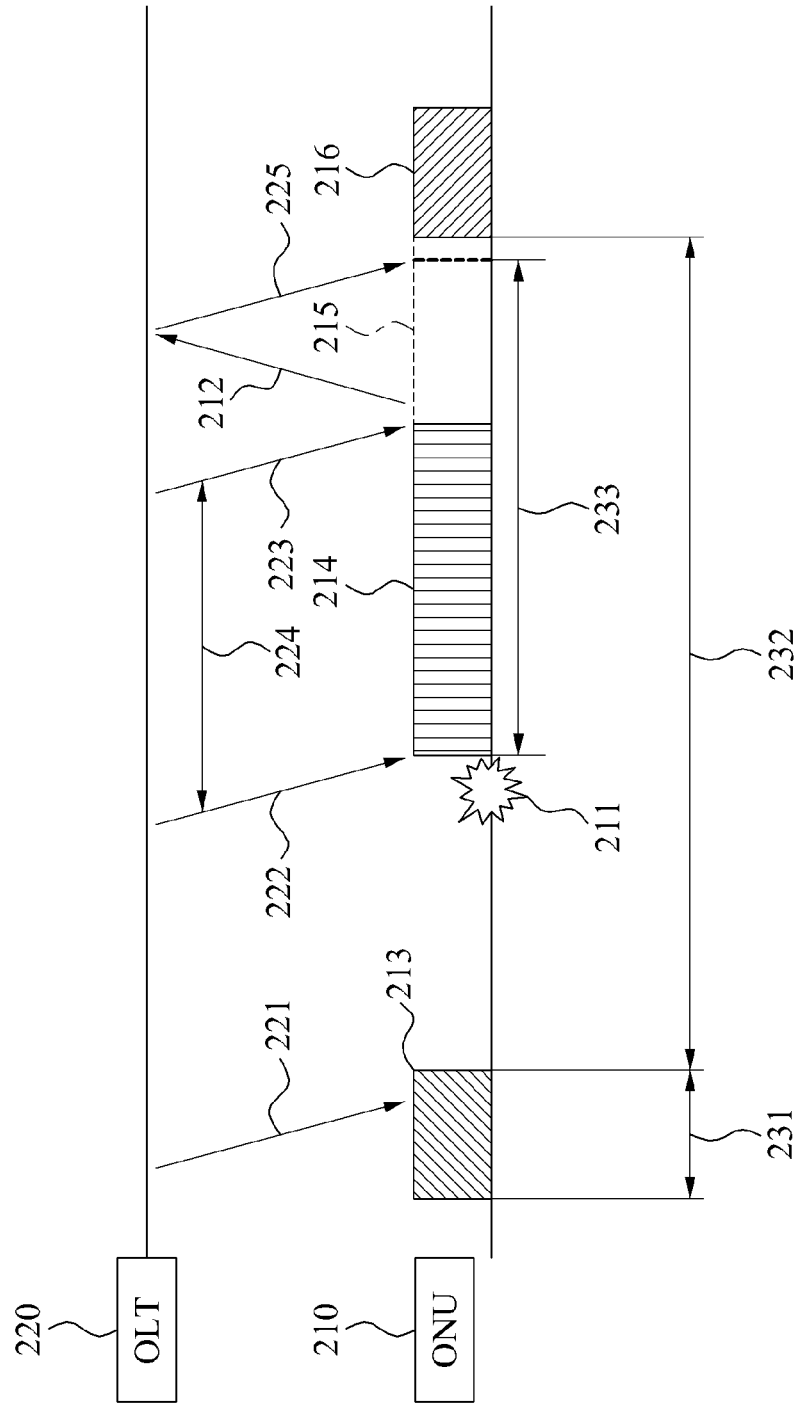
FIG. 2 is a diagram illustrating a process of transmitting and receiving data between an optical line terminal (OLT) and an ONU operating in a doze mode in a PON system according to a related art.

FIG. 2 is a diagram illustrating a process of transmitting and receiving data between an OLT 220 and an ONU 210 operating in a doze mode in a PON system according to a related art.

Referring to FIG. 2, an example of the ONU 210 operating in the doze mode is disclosed. In FIG. 2, the ONU 210 may operate in the doze mode, and the OLT 220 may transmit upstream bandwidth maps 221, 222, and 223 to the ONU 210 based on a predetermined interval 224. The ONU 210 operating in the doze mode may operate in a listen state for a sleep time 232, and operate in doze aware states 213 and 216 for an aware time 231. When an occurrence 211 of a local wake-up indication (LWI) is sensed while the ONU 210 is in the doze aware state 213, the ONU 210 may switch to a wake up state 214 and immediately prepare to transmit an awake PLOAM message 212 to the OLT 220 and to enter a normal mode 215. In this example, in order to transmit the awake PLOAM message 212, receipt of an upstream bandwidth map from the OLT 220 may be necessary. An interval between the occurrence 211 of the LWI and the transmission of the awake PLOAM message 212 to the OLT 220 may correspond to a delay time 233 used to transmit upstream data. In order to reduce the power consumption of the ONU 210 operating in the doze mode and minimize the delay time 233 used to transmit the upstream data, the upstream bandwidth maps 221, 222, and 223 may be transmitted at the proper transmission interval 224. When the awake PLOAM message 212 is transmitted to the OLT 220, the OLT 220 may transmit a data grant message 225 to the ONU 210.

Figure 3:
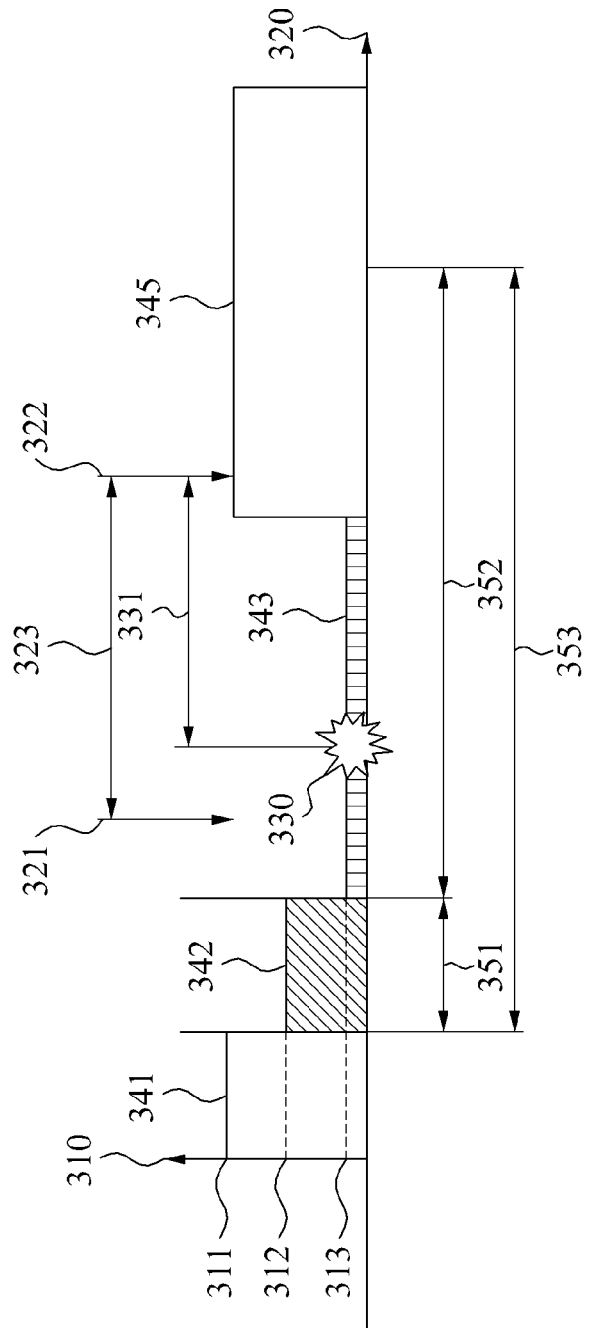
FIG. 3 is a diagram illustrating a transmission delay time of upstream data when a local wake-up indication (LWI) event is applied to an ONU operating in a doze mode in a PON system.

FIG. 3 is a diagram illustrating a transmission delay time of upstream data when an LWI event is applied to an ONU operating in a doze mode in a PON system.

The transmission delay time of the upstream data may be defined as an upstream data service delay time. The upstream data service delay time may refer to an interval between an occurrence of a request for upstream data transmission from the ONU and a performance in response to the request for upstream data transmission. For example, the upstream data service delay time may correspond to a delay time used until a state transition to a normal mode is performed after the LWI event occurs in the ONU.

A desired upstream data service delay time refers to a targeted upstream data service delay time. For example, the desired upstream data service delay time may be determined by a network manager or automatically calculated based on numerous parameters in the PON system. The parameters may include a required system reaction rate.

Referring to FIG. 3, a method of determining a service interval (SI) 323 in the OLT and the ONU is disclosed. An interval to transmit upstream bandwidth maps 321 and 322 may be referred to as the SI 323. An average time 331 corresponding to an interval between an occurrence 330 of an LWI event and a transition of the ONU to a normal mode 345 may be referred to as $T_d$. In a graph of FIG. 3, a y axis 310 denotes a power consumption of the ONU, and an x axis 320 denotes a time. The ONU may operate in a normal mode 341 in which the power consumption of the ONU corresponds to a normal value 311, and operate in doze modes 342 and 343 in which the power consumption of the ONU is repeatedly changed between an aware value 312 and a sleep value 313. The ONU operating in the doze mode may switch to a doze aware state 342 for a time $T_{aware}$ 351, and switch to a listen state 343 for a time $T_{sleep}$ 352. The time $T_{aware}$ 351 and the time $T_{sleep}$ 352 may be referred to as a single cycle 353. In response to the occurrence 330 of the LWI event in the ONU operating in the listen state 343, the ONU may wake up from the doze mode and send an awake PLOAM message to the OLT for a transition to a normal mode.

The interval 323 to transmit the upstream bandwidth maps 321 and 322 may be determined based on a desired upstream data service delay time and a delay time determined based on a characteristic of the ONU. In a case in which the SI 323 is divided into predetermined intervals τ, a value of τ may be expressed by Equation 1.

$$\tau = SI/N \quad \text{[Equation 1]}$$

In this example, the average time $T_d$ 331 may be calculated as expressed by Equation 2.

$$T_d = \frac{1}{N}\sum_{n=1}^{N}(SI - n\tau) = \frac{SI}{2} - \frac{SI}{2N} \quad \text{[Equation 2]}$$

In Equation 2, when it is assumed that N is extremely great in comparison to an extremely small τ by which the SI 323 is to be divided, Equation 3 may be satisfied.

$$\lim_{N \to \infty} \frac{SI}{2N} = 0 \quad \text{[Equation 3]}$$

Thus, the average time $T_d$ 331 may be calculated as expressed by Equation 4.

$$T_d = \frac{SI}{2} \quad \text{[Equation 4]}$$

From the average time $T_d$ 331 derived through the process shown in Equations 1 to 4, it may be understood that an average delay time used for the transition of the ONU from the doze mode to the normal mode corresponds to 50% of the SI 323. Accordingly, on average, the ONU may switch to the normal mode after 50% of the SI 323 elapses when an LWI event occurs. The SI 323 may be set to be twice an upstream data service delay time desired to be guaranteed in a service.

The SI 323 may be determined based on the desired upstream data service delay time and the delay time determined based on the characteristic of the ONU. A consideration for an actual system may be reflected in determining of the SI 323. The consideration may correspond to the delay time determined based on the characteristic of the ONU. The delay time determined based on the characteristic of the ONU may include an operating time of a function block to detect an LWI event occurring in the ONU, an operating time used to control an optical transceiver of the ONU, a delay time used to process data in a memory of the ONU, and a time used to process a PLOAM message in the ONU. Since the delay time determined based on the characteristic of the ONU may be dependent on hardware or an implementation method, and in general, a considerable processing time may be used, the delay time determined based on the characteristic of the ONU may be referred to as $D_{process}$. The average time $T_d$ 331 may be calculated as expressed by Equation 5.

$$T_d = \frac{SI + D_{process}}{2} \quad \text{[Equation 5]}$$

The SI 323 may be calculated using Equation 6.

$$SI = 2T_d - D_{process} \quad \text{[Equation 6]}$$

In Equation 6, SI denotes the interval 323 to transmit the upstream bandwidth maps, $T_d$ denotes the desired upstream data service delay time, and $D_{process}$ denotes the delay time determined based on the characteristic of the ONU.

The SI 323 may be set to be a value less than twice the desired upstream data service delay time. When the delay time $D_{process}$ corresponds to few milliseconds and the average time $T_d$ 331 corresponds to tens of milliseconds, the SI 323 may be determined within tens of milliseconds. As the SI 323 decreases, the delay time may also decrease. However, when an upstream bandwidth map is transmitted to the ONU operating in the sleep mode with exceeding frequency, an upstream data bandwidth of another ONU being serviced may be occupied and thus, a quality of service may be degraded. Accordingly, the SI 323 may be set not to exceed twice the desired upstream data service delay time.

In an embodiment, although the time $T_{sleep}$ 352 during which the ONU operates in the listen state may be set to be a sufficiently great value, for example, tens of seconds, to increase a power saving effect in the ONU system, a data delay time may be reduced by transmitting upstream bandwidth maps at the SI 323 derived through the foregoing process. Thus, the power saving effect may be maximized without affecting the quality of service.

Figure 4:
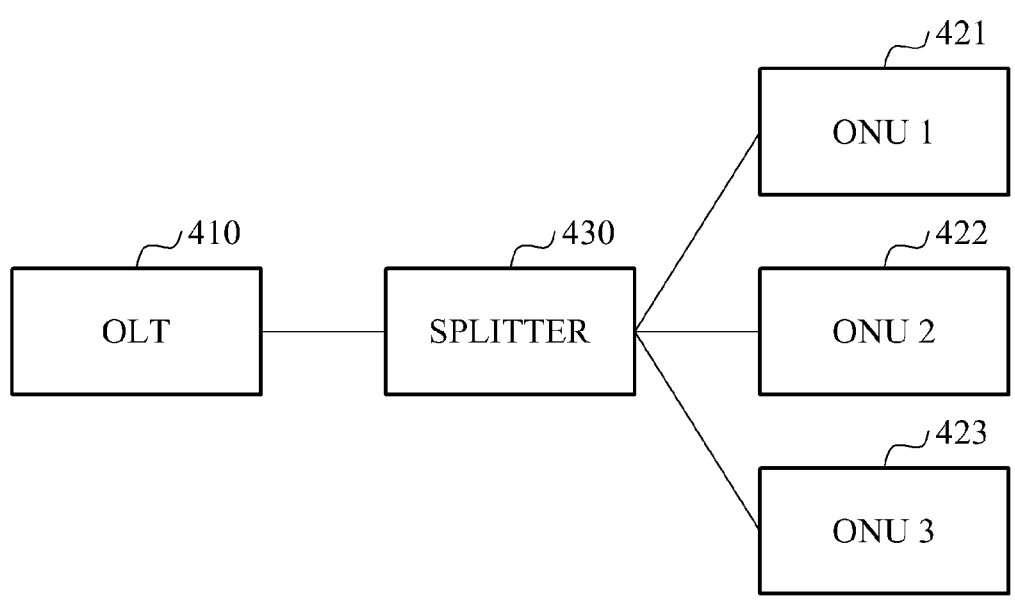
FIG. 4 is a block diagram illustrating an OLT and ONUs in a PON system.

FIG. 4 is a block diagram illustrating an OLT 410 and ONUs 421, 422, and 423 in a PON system.

Referring to FIG. 4, the PON system may include the ONUs 421, 422, and 423 separated by a splitter 430 and connected to the OLT 410 through an optical line. The OLT 410 may manage sleep mode state machines of the registered ONUs 421, 422, and 423. The OLT 410 may communicate with the ONU 421 through the optical line and communicate with the ONU 422 through the optical line, using a time division multiple access (TDMA) scheme.

Figure 5:
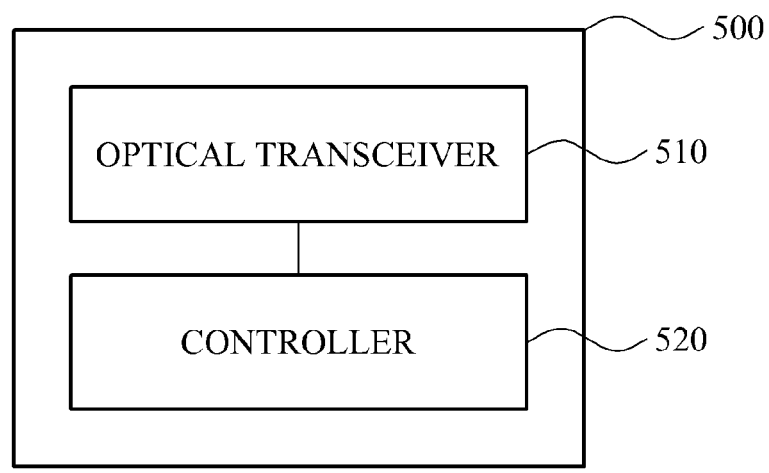
FIG. 5 is a block diagram illustrating an OLT in a PON system.

FIG. 5 is a block diagram illustrating an OLT 500 in a PON system.

Referring to FIG. 5, the OLT 500 may include an optical transceiver 510 to communicate with at least one ONU through an optical line, and a controller 520 to control the optical transceiver 510 to transmit an upstream bandwidth map to the ONU at a predetermined transmission interval. The optical transceiver 510 may communicate with the at least one ONU through the optical line. The transmission interval may be determined based on a desired upstream data service delay time.

In an embodiment, the upstream bandwidth map may include bandwidth information for reception of a PLOAM message and an OMCI. In another embodiment, the upstream bandwidth map may further include bandwidth information for data transmission.

Figure 6:
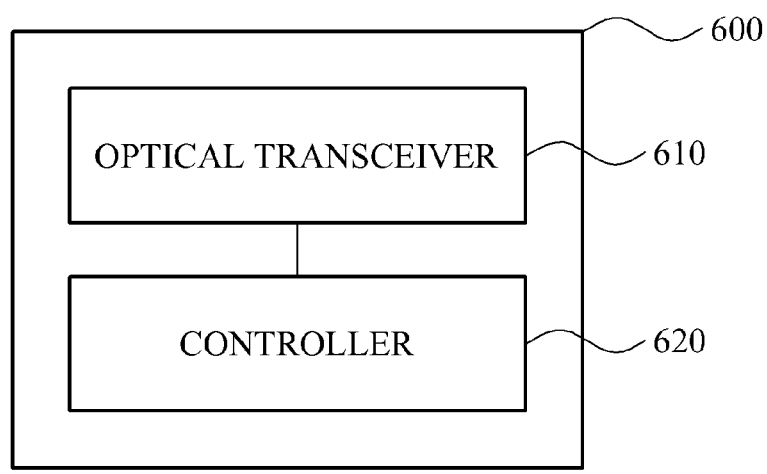
FIG. 6 is a block diagram illustrating an ONU in a PON system.

FIG. 6 is a block diagram illustrating an ONU 600 in a PON system.

Referring to FIG. 6, the ONU 600 may include an optical transceiver 610 to receive an upstream bandwidth map from an OLT at a predetermined transmission interval, and a controller 620 to control a state transition of the optical transceiver 610 to a sleep mode for a predetermined period. The transmission interval may be determined based on a desired upstream data service delay time.

The ONU 600 may not transmit idle data for a time $T_{sleep}$ during which the ONU 600 operates in a listen state, and transmit idle data to the OLT for a time $T_{aware}$ during which the ONU operates in a doze aware state. The ONU according to G987.3 standards may be set to transmit idle data when an upstream bandwidth map is received, although actual data to be transmitted is absent. The OLT 500 of FIG. 5 may not determine that an error occurs although data is not received from the ONU 600. The OLT 500 may periodically verify whether the ONU 600 operates normally, based on idle data received from the ONU 600 for a time $T_{aware}$ during which the ONU 600 operates in the doze aware state.

Figure 7:
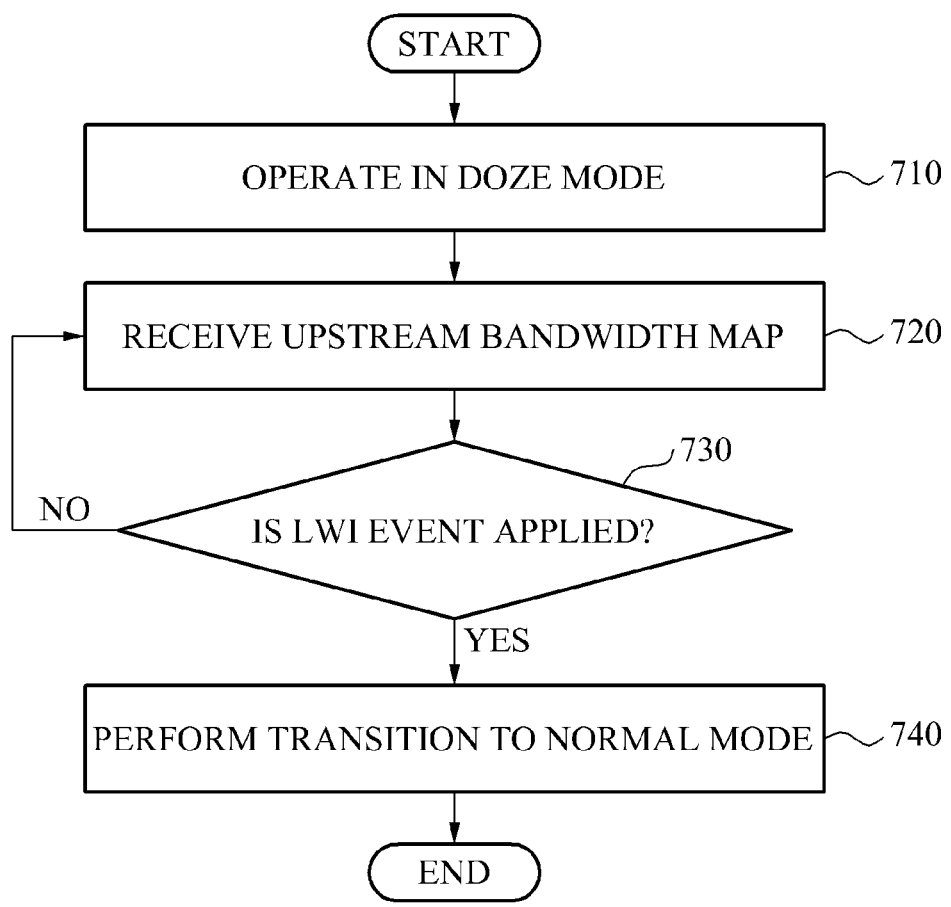
FIG. 7 is a flowchart illustrating a method of saving power in an ONU connected to an OLT through an optical line according to an embodiment of the present invention.

FIG. 7 is a flowchart illustrating a method of saving power in an ONU connected to an OLT through an optical line according to an embodiment of the present invention.

Referring to FIG. 7, the method of saving power in the ONU connected to the OLT through the optical line is disclosed. The power saving method may include operation 710 of operating the ONU in a doze mode, operation 720 of receiving an upstream bandwidth map transmitted from the OLT at a predetermined transmission interval, operation 730 of verifying whether an LWI event is applied to the ONU or the OLT, and operation 740 of performing a transition to a normal mode when an LWI event is applied to the ONU or the OLT.

In operation 710, the ONU operating in a doze mode may repeatedly switch between a doze aware state and a listen state. Repeated switching between the doze aware state and the listen state may be referred to as a sleep mode or a doze mode. Values predetermined through an OMCI may be used for a time during which the ONU operates in the doze aware state and a time during which the ONU operates in the listen state, respectively. The ONU may activate a transmitter of an optical transceiver in the doze aware state, and deactivate the transmitter in the listen state, thereby reducing the power consumption. In the doze mode, a receiver of the optical transceiver may maintain an activation state continually to maintain a quality of service which is sensitive to a transmission delay time of data to be transmitted downstream.

In operation 720, the ONU may receive an upstream bandwidth map transmitted from the OLT at the predetermined transmission interval. The transmission interval may be determined based on a desired upstream data service delay time and a delay time determined based on a characteristic of the ONU. In a case in which the transmission interval, for example, an SI, is divided into predetermined intervals τ, a value of τ may be expressed by Equation 7.

$$\tau = SI/N \qquad \text{[Equation 7]}$$

In this example, an average time $T_d$ used for a transition to a normal mode may be calculated as expressed by Equation 8.

$$T_d = \frac{1}{N}\sum_{n=1}^{N}(SI - n\tau) = \frac{SI}{2} - \frac{SI}{2N} \qquad \text{[Equation 8]}$$

In Equation 8, when it is assumed that N is extremely great in comparison to an extremely small τ by which the SI is to be divided, Equation 9 may be satisfied.

$$\lim_{N \to \infty} \frac{SI}{2N} = 0 \qquad \text{[Equation 9]}$$

Thus, the average time $T_d$ may be calculated as expressed by Equation 10.

$$T_d = \frac{SI}{2} \qquad \text{[Equation 10]}$$

From the average time $T_d$ derived through the process shown in Equations 7 to 10, it may be understood that an average delay time used for the transition of the ONU from the doze mode to the normal mode corresponds to 50% of the SI. Accordingly, on average, the ONU may switch to the normal mode after 50% of the SI elapses when an LWI event occurs. The SI may be set to be twice an upstream data service delay time desired to be guaranteed in a service.

The SI may be determined based on the desired upstream data service delay time and the delay time determined based on the characteristic of the ONU. Consideration in terms of an actual system may be reflected during determination of the SI. The consideration may correspond to the delay time determined based on the characteristic of the ONU. The delay time determined based on the characteristic of the ONU may include an operating time of a function block to detect an LWI event occurring in the ONU, an operating time used to control an optical transceiver of the ONU, a delay time used to process data in a memory of the ONU, and a time used to process a PLOAM message in the ONU. Since the delay time determined based on the characteristic of the ONU may be dependent on hardware or an implementation method and in general, a considerable amount of time may be used for processing, the delay time determined based on the characteristic of the ONU may be referred to as $D_{process}$. The average time $T_d$ may be calculated as expressed by Equation 11.

$$T_d = \frac{SI + D_{process}}{2} \qquad \text{[Equation 11]}$$

The SI may be calculated using Equation 12.

$$SI = 2T_d - D_{process} \qquad \text{[Equation 12]}$$

In Equation 12, SI denotes the interval to transmit upstream bandwidth maps, $T_d$ denotes the desired upstream data service delay time, and $D_{process}$ denotes the delay time determined based on the characteristic of the ONU. Accordingly, the SI may be set to be a value less than twice the desired upstream data service delay time. When the delay time $D_{process}$ corresponds to few milliseconds and the average time $T_d$ corresponds to tens of milliseconds, the SI may be determined within tens of milliseconds. As the SI decreases, the delay time may also decrease. However, when an upstream bandwidth map is transmitted to the ONU operating in the sleep mode with exceeding frequency, an upstream data bandwidth of another ONU being serviced may be occupied and thus, a quality of service may be degraded. Accordingly, the SI may be set not to exceed twice the desired upstream data service delay time.

In operation 730, whether the LWI event is applied to the ONU or the OLT may be verified.

A case in which the LWI event is applied to the ONU may include one of a case in which a subscriber of the ONU turns on a PC, a case in which the subscriber picks up a receiver of a VoIP phone, and a case in which the subscriber turns on an IPTV. A case in which the LWI event is applied to the OLT may include a case in which an external phone call is received at a VoIP phone.

In an example, when an LWI event is not applied to the ONU or the OLT, the ONU may return to operation 720 to receive an upstream bandwidth map at the predetermined interval. When an LWI event is applied to the ONU or the OLT, operation 740 may be performed.

When an LWI event is applied to the ONU or the OLT, the ONU may perform a transition to the normal mode, in operation 740.

When an LWI event is applied while the ONU operating in the doze mode is in a listen state or a doze aware state, the ONU may immediately prepare to transmit an awake PLOAM message to the OLT. In this example, in order to transmit the awake PLOAM message, receipt of an upstream bandwidth map from the OLT may be necessary. An interval between the application of the LWI event and the transmission of the PLOAM message to the OLT may correspond to a delay time used for upstream data transmission.

When an LWI event is applied to the ONU operating in the doze mode, the ONU may perform a transition to the normal mode, and transmit, to the OLT, a PLOAM message to inform that the transition to the normal mode is performed. The OLT receiving the PLOAM message from the ONU may change a state of the ONU to the normal mode.

Figure 8:
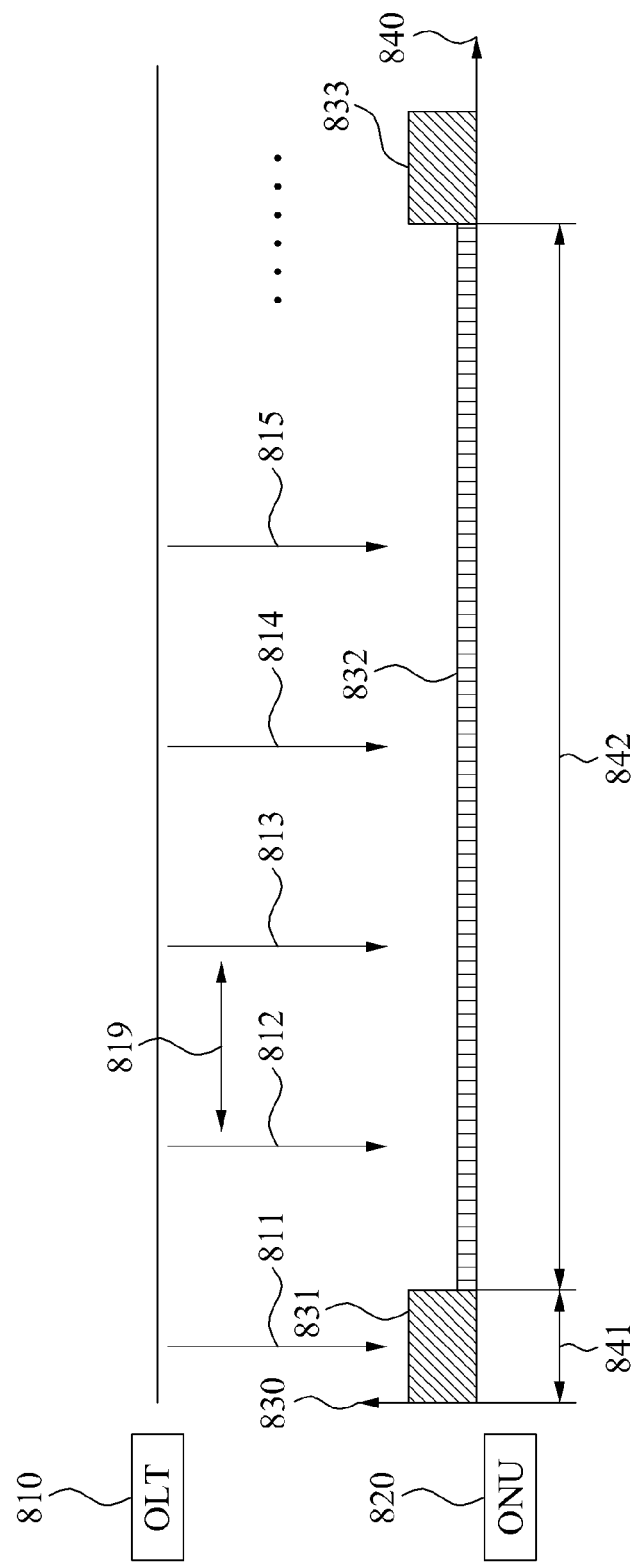
FIG. 8 is a diagram illustrating a power consumption of an ONU operating in a doze mode in a PON system according to an embodiment of the present invention.

FIG. 8 is a diagram illustrating a power consumption of an ONU 820 operating in a doze mode in a PON system according to an embodiment of the present invention.

Referring to FIG. 8, an OLT 810 may transmit upstream bandwidth maps 811, 812, 813, 814, and 815 to the ONU 820 operating in the doze mode based on a predetermined transmission interval 819. The upstream bandwidth maps 811, 812, 813, 814, and 815 may include bandwidth information for reception of a PLOAM message and an OMCI, and bandwidth information for data transmission.

In FIG. 8, a graph of a power consumption of the ONU 820 is illustrated. In the graph, a y axis 830 denotes a power consumption, and an x axis 840 denotes a time. The ONU 820 operating in the doze mode may repeatedly switch between a doze aware state 831 or 833 and a listen state 832.

As a time $T_{sleep}$ 842 during which the ONU 820 operates the listen state 832 increases, the power consumption may decrease.

The ONU 820 may not transmit idle data for the time $T_{sleep}$ 842 during which the ONU operates in the listen state 832, and transmit idle data to the OLT 810 for a time $T_{aware}$ 841 during which the ONU 820 operates in the doze aware state 831 or 833. The OLT 810 may not determine that an error occurs although data is not received from the ONU 820 operating in the listen state 832. The ONU 820 according to G987.3 standards may be set to transmit idle data when an upstream bandwidth map is received although actual data to be transmitted is absent. The OLT 810 may periodically verify whether the ONU 820 operates normally, based on idle data received from the ONU 820 for the time $T_{aware}$ 841.

According to an embodiment of the present invention, an ONU connected to an OLT and having a power saving effect may increase a power reduction efficiency using a relatively long time $T_{sleep}$.

According to an embodiment of the present invention, an OLT may reduce a transmission delay time of upstream data using a relatively short transmission interval of an upstream bandwidth map.

According to an embodiment of the present invention, a method of saving power in an ONU connected to an OLT through an optical line may increase a power reduction efficiency and reducing a transmission delay time of upstream data using a relatively long time $T_{sleep}$ and a relatively short transmission interval of an upstream bandwidth map.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical line terminal (OLT) comprising:
   an optical transceiver configured to communicate with at least one optical network unit (ONU) through an optical line; and
   a controller configured to control the optical transceiver to transmit an upstream bandwidth map to the ONU at a predetermined transmission interval, a length of which is determined based on a desired upstream data service delay time and a delay time determined based on a characteristic of the ONU.

2. The OLT of claim 1, wherein the delay time determined based on the characteristic of the ONU is determined based on at least one of:
   an operating time of a function block to detect a local wake-up indication (LWI) event occurring in the ONU;
   an operating time used to control an optical transceiver of the ONU;
   a delay time used to process data in a memory of the ONU; and
   a time used to process a physical layer operation, administration, and maintenance (PLOAM) message in the ONU.

3. The OLT of claim 1, wherein the transmission interval is calculated by the following equation, $$SI = 2T_d - D_{process},$$

wherein SI denotes the transmission interval, $T_d$ denotes the desired upstream data service delay time, and $D_{process}$ denotes a delay time determined based on a characteristic of the ONU.

4. The OLT of claim 1, wherein the transmission interval is set to be less than or equal to twice the desired upstream data service delay time.

5. The OLT of claim 1, wherein the upstream bandwidth map comprises bandwidth information for reception of a physical layer operation, administration, and maintenance (PLOAM) message and an ONU management control interface (OMCI).

6. The OLT of claim 5, wherein the upstream bandwidth map further comprises bandwidth information for data transmission.

7. A method of saving power in an optical network unit (ONU) connected to an optical line terminal (OLT) through an optical line, the method comprising:
   operating the ONU in a doze mode;
   receiving an upstream bandwidth map transmitted from the OLT at a predetermined transmission interval, a length of which is determined based on a desired upstream data service delay time and a delay time determined based on a characteristic of the ONU; and
   performing a state transition to a normal mode when a local wake-up indication (LWI) event is applied to the ONU or the OLT.

8. The method of claim 7, wherein the delay time determined based on the characteristic of the ONU is determined based on at least one of:
   an operating time of a function block to detect a local wake-up indication (LWI) event occurring in the ONU;
   an operating time used to control an optical transceiver of the ONU;
   a delay time used to process data in a memory of the ONU; and
   a time used to process a physical layer operation, administration, and maintenance (PLOAM) message in the ONU.

9. The method of claim 7, wherein the transmission interval is calculated by the following equation, $$SI = 2T_d - D_{process},$$

wherein SI denotes the transmission interval, $T_d$ denotes the desired upstream data service delay time, and $D_{process}$ denotes a delay time determined based on a characteristic of the ONU.

10. The method of claim 7, wherein the transmission interval is set to be less than or equal to twice the desired upstream data service delay time.

11. The method of claim 7, wherein the upstream bandwidth map comprises bandwidth information for reception of a physical layer operation, administration, and maintenance (PLOAM) message and an ONU management control interface (OMCI).

12. The method of claim 11, wherein the upstream bandwidth map further comprises bandwidth information for data transmission.

13. The method of claim 7, further comprising:
   not transmitting idle data for a time during which the ONU operates in a listen state, and transmitting idle data to the OLT for a time during which the ONU operates in a doze aware state, by the ONU.

* * * * *